United States Patent [19]
Silva et al.

[11] Patent Number: 5,450,078
[45] Date of Patent: Sep. 12, 1995

[54] MEMBRANE COMPUTER KEYBOARD AND METHOD

[75] Inventors: Michael J. Silva; Brian P. Lee; Arjan S. Khalsa; David C. Schmitt, all of Richmond, Calif.

[73] Assignee: Intellitools, Inc., Novato, Calif.

[21] Appl. No.: 958,246

[22] Filed: Oct. 8, 1992

[51] Int. Cl.$^6$ .................................. H03M 11/00
[52] U.S. Cl. ........................ 341/23; 341/22; 341/26; 340/825.3
[58] Field of Search .............. 341/23, 22, 21, 26, 341/31; 345/168, 172, 173, 175; 364/709.1, 709.12, 709.15; 235/439, 454, 455, 145 R; 340/825.3

[56] References Cited

U.S. PATENT DOCUMENTS

| | | | |
|---|---|---|---|
| 4,030,094 | 6/1977 | Anderson | 341/23 |
| 4,468,612 | 8/1984 | Starr | 324/66 |
| 4,527,250 | 7/1985 | Galdun et al. | 341/23 |
| 4,914,691 | 4/1990 | Berger | 341/23 |
| 5,006,842 | 4/1991 | Tobol | 340/825.3 |
| 5,237,689 | 8/1993 | Behnke | 395/700 |

Primary Examiner—Jeffery A. Hofsass
Assistant Examiner—Andrew M. Hill
Attorney, Agent, or Firm—H. Michael Brucker

[57] ABSTRACT

A computer keyboard having an output port through which scan codes are directed to a computer CPU over a cable, the keyboard of the kind having a touch activated membrane switch onto which one of a plurality of key layout overlays can be installed. Each of a plurality of different stored data tables is operable when selected to determine the particular scan code that is directed through the keyboard output port over the cable in response to a membrane switch being activated. Each overlay being coded in a way that can be read by an overlay code identification device which automatically operates in response to a coded key layout overlay being installed onto the keyboard to read the overlay code, which is then used by a data table selector to select a particular data table for use with the installed overlay.

4 Claims, 3 Drawing Sheets

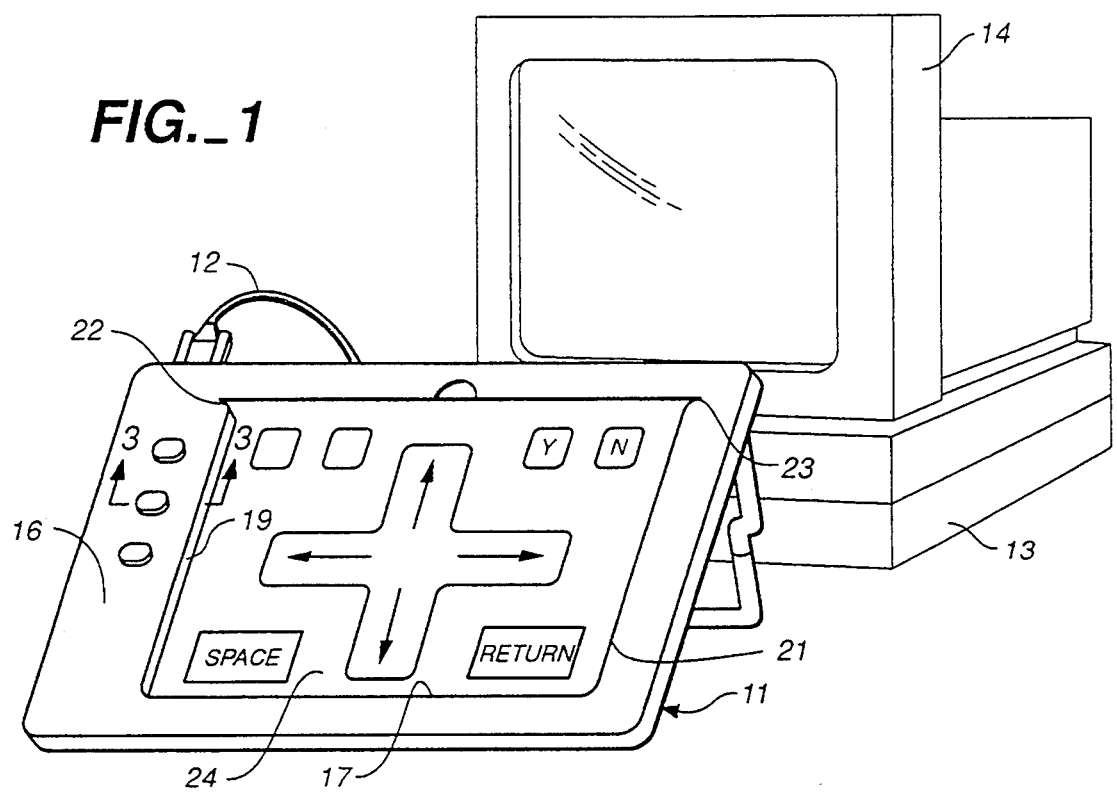
FIG._1
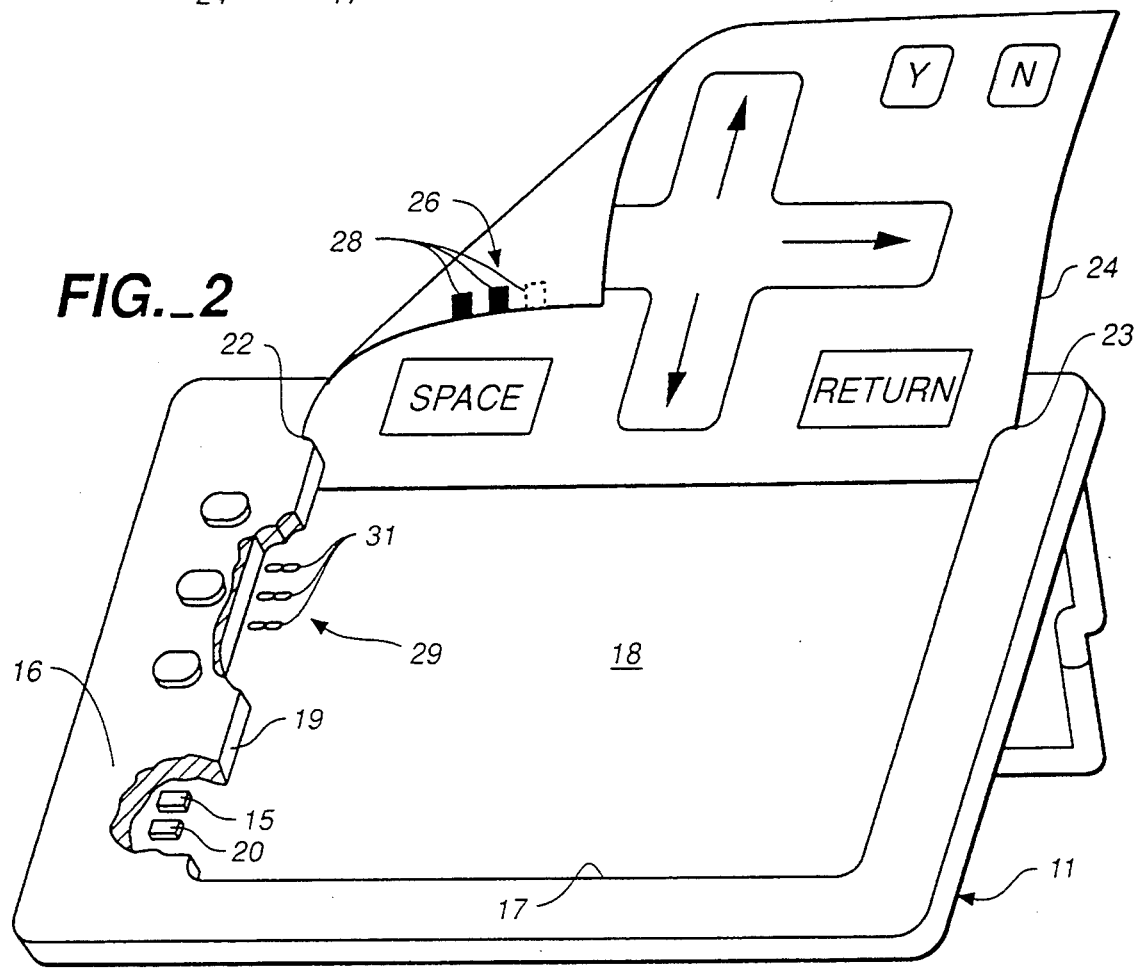
FIG._2

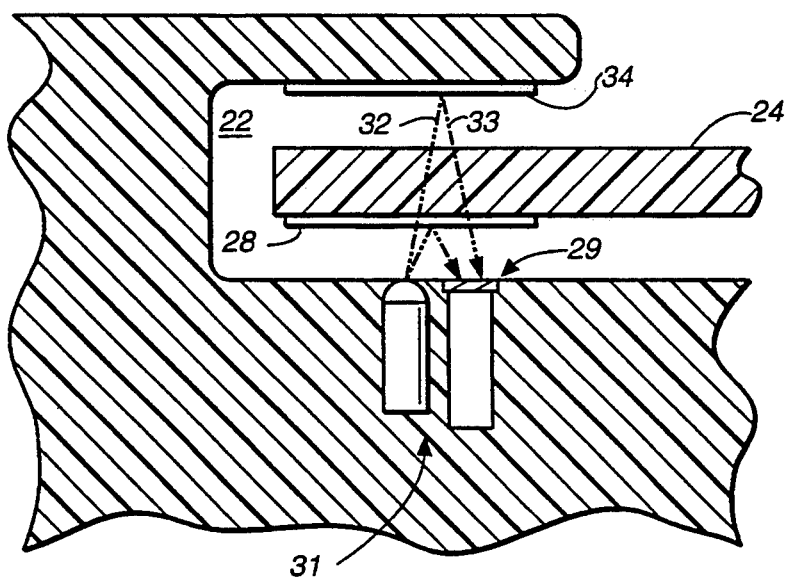
FIG._3
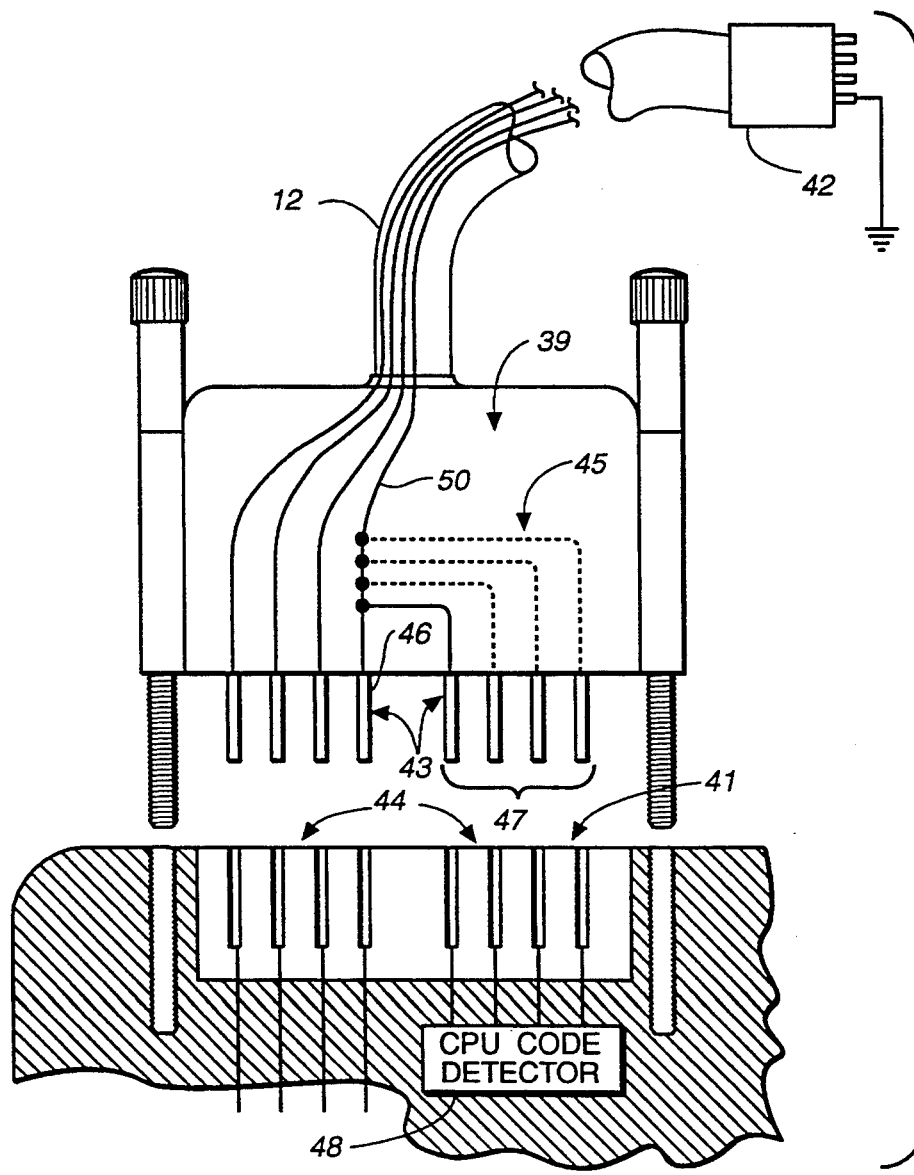
FIG._5

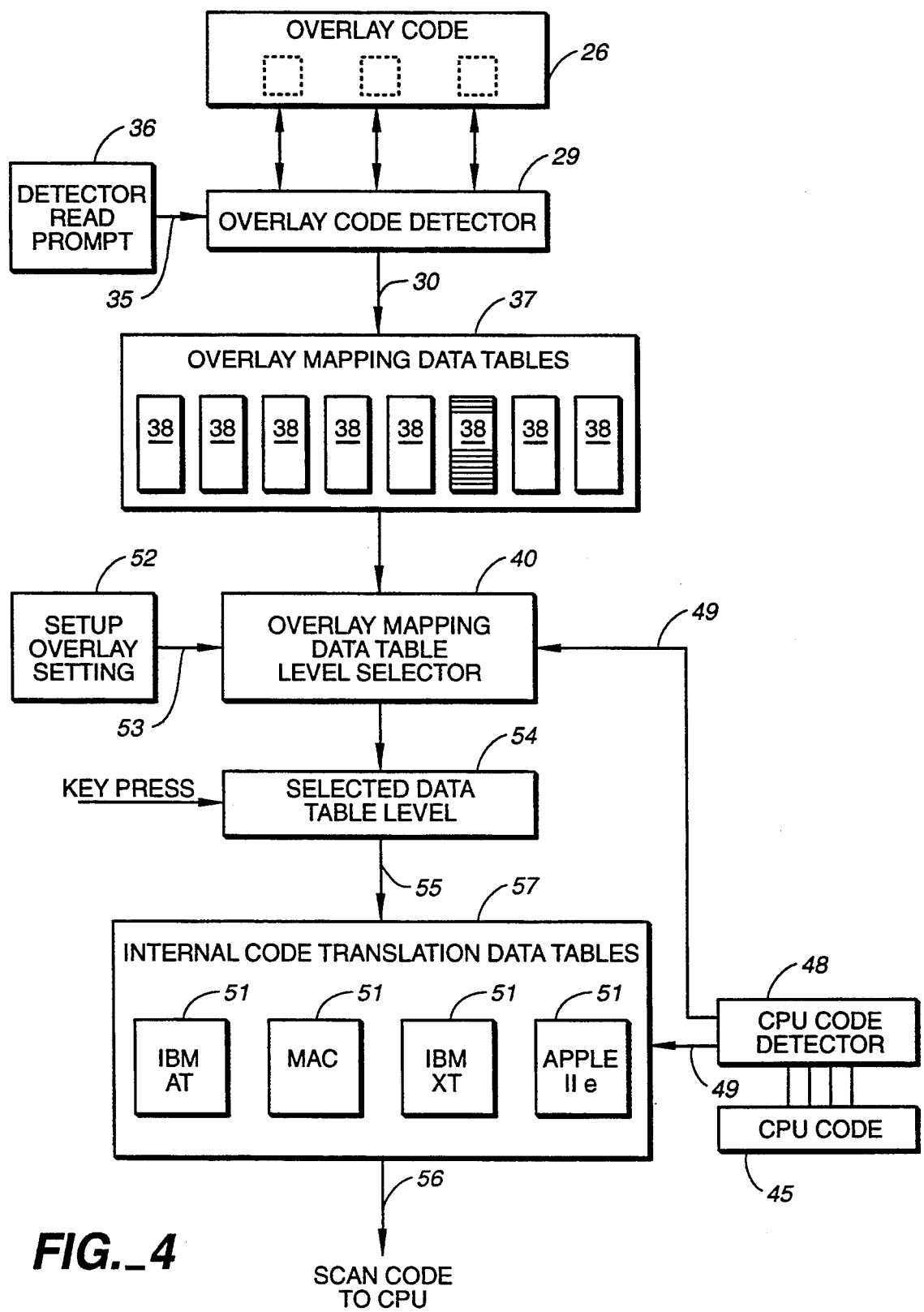
FIG._4

MEMBRANE COMPUTER KEYBOARD AND METHOD

BACKGROUND OF THE INVENTION

1. Field of the Invention

The present invention relates to computer keyboards and in particular to computer keyboards utilizing a touch operated membrane switch with key layout overlays.

2. The Prior Art

Generally speaking, a computer is typically composed of the basic elements of a central processing unit (CPU), a data input device, and an output device. The input device (for a manually operated computer) is most commonly a keyboard, and the output device is typically a monitor providing a visual display.

Generally speaking, a keyboard is a collection of "keys" which when pressed (activated) generate, what is commonly referred to as, scan codes that are transmitted (typically via a cable) to, and understood by, the connected CPU. These key-generated scan codes typically represent data and commands for operating the computer, and differ for different CPUs. That is, a scan code for the letter "a" for an IBM ® CPU will differ from the scan code for the letter "a" for a Macintosh ® CPU, both in the content of the code and in the protocol of sending that content.

By custom, keyboards have individual letter keys arranged in the same pattern (QWERTY) as was originated for typewriters, plus a number of command keys for various operations of the computer. Computer keyboard operation is therefore very similar to typewriter operation and requires essentially the same general degree of manual dexterity.

In 1979 Steve Gensler developed a different kind of keyboard to accommodate the needs of a friend who had cerebral palsy. The basic element of this new keyboard was a keypad utilizing a membrane switch array rather than a number of discrete keys (for example, an array of 576 switches—each approximately 0.30 inches tall and 0.50 inches wide—arranged in an array of 24 rows by 24 columns). This good Samaritan act by Gensler led to the creation of Unicorn Engineering, a company which over the past decade has studied, developed, produced and marketed membrane keyboards for users with motor difficulties from such disabilities as cerebral palsy, mental retardation, brain trauma, visual impairments and the like.

A press on a membrane switch at a specific location results in the activation of a switch. A plurality of adjacent switches can be effectively grouped so that a press of any one is equivalent (in the resulting information sent to the CPU) to the press of any other switch in the group. In this way, a "key" can be created of a size and/or shape that meets special needs of a particular user or group of users. The grouping of switches to form "keys" is commonly refereed to as keyboard "mapping".

In order for a keyboard to operate as a data entry device for a CPU, it is necessary for it to be able to send information to the CPU that the CPU interprets as key presses from a standard keyboard. This is accomplished either by sending scan codes directly to the CPU's keyboard input port (as does a standard keyboard) or by sending information to another port of the CPU (such as a serial port) and using software running on the CPU to convert the transmitted information into the approximate equivalent of a standard keyboard press. The later method, because it does not send actual scan code to the CPU, leads to incompatibility with some software. Prior to the present invention, it has been necessary for a membrane keyboard to be connected to the CPU through a separate piece of hardware—an interface device containing hardware and firmware, and in some cases software—in order to deliver useful information to a CPU. The vast majority of such interface devices utilize a serial port, ersatz scan code approach rather than the actual scan code approach. Because different CPU's recognize different scan codes, a particular interface device has typically been necessary to transform membrane keyboard presses into recognizable information for the particular computer CPU to which it is connected. Those prior art interface devices designed to work with more than one type of CPU are both difficult to use and require manual operation each time a different CPU is attached.

While prior art interface devices have provided membrane keyboards with the ability to communicate with a CPU, they do so only after extensive setup and user training. For people with disabilities the use of an interface device, and thus the computer itself, has often required the dedication of much time, energy, resources and the assistance of others. In addition, prior art interface devices typically are not universally compatible with all software and thus limit the programs that can be run with a membrane switch keyboard.

Prior art keyboards, of the type to which the present invention relates, suffer from two or more of the following disadvantages: they require difficult to use interface hardware; they limit the software that can be used; they require manual operations to recognize different overlays; and they have limited computer compatibility.

One of the primary advantages of the membrane keyboard is its suitability for creating "keys" of shapes and sizes that meet particular user requirements not met by standard keyboards. The "keys" created are typically graphically presented to the user on a thin card (overlay) printed with the desired keyboard keys and inserted over the membrane switch. These keys can be color coded as well as symbolically or alpha-numerically labeled and of a size that aids those without the dexterity to operate a standard keyboard. Typically an overlay may contain letters of the alphabet (presented either in sequence or in QWERTY), numbers, computer operation commands, iconic symbols, pictures or a combination of those. Standard overlay designs have been developed to meet the needs of large segments of those with special needs, and custom overlays can be created (with the use of special software) to meet more personal needs.

When a "key" of an installed overlay is activated (pressed) the interface will deliver the selected data (alpha-numeric data, computer command, etc.) to the CPU, only if a data table is in place to translate keyboard switch activation into information that is correct and ultimately understandable to the attached CPU. Such a data table, which typically ranges in size from 2 to 20 kilobytes of data, corresponds each switch of the membrane switch with an internal code. For keyboards designed to be used with more than one overlay, it is necessary that the particular overlay in place on the membrane keyboard be identified to, and recognized by, the interface or the keyboard's embedded microprocessor so that a corresponding data table can be selected for operation. Only then will the activation of a switch (pressing of a key) be translated into information that the computer recognizes and which matches the symbol or command represented by the key pressed.

This overlay recognition requirement is accomplished in the prior art by some manual act (most typically by using a standard keyboard to make a selection from a list of choices) that results in delivering a code to the interface telling it which overlay is being used. For some disabled users this is not always possible to accomplish and in any event, presents to most disabled users another difficult task to accomplish.

The state of the art of membrane type computer keyboards prior to the present invention is that: the keyboard itself does not output CPU understandable information or scan codes but rather depends on a separate interface device to do so; a differently configured interface device is required for each different type of CPU with which the keyboard is to operate; and each different keyboard overlay must be manually identified in some way to the interface device or CPU after being inserted on the keyboard. Thus, before a computer could be operated with a prior art membrane keyboard, an interface device had to be selected, installed and operated, and a keyboard overlay had to be inserted and manually identified to the interface. Each time an overlay is changed, it has to be manually identified. Each time a different CPU is used the interface must be reconfigured in some way or a new interface selected.

By contrast, the membrane keyboard of the present invention requires no separate interface device and yet is able to operate with a variety of different CPUs by the simple selection of a keyboard cable, and automatically recognizes numerous overlays without requiring any manual act beyond inserting the overlay in place onto the keyboard.

SUMMARY OF THE INVENTION

The membrane keyboard of the present invention has an output port that delivers standard scan codes for direct input into a CPU keyboard input port. The simple act of selecting a cable automatically adapts the keyboard to deliver recognizable scan codes to that CPU. Thus, to use the keyboard of the present invention with a Macintosh ® computer after having used it with an IBM ® computer, for example, requires only the substitution of the keyboard cable that connects the keyboard output port to the CPU keyboard input port. The keyboard automatically makes all of the internal alterations necessary to then send scan code understandable to a Macintosh ® CPU.

In the present invention, the simple act, alone, of inserting an overlay onto the membrane keyboard automatically adapts the keyboard to generate the matching key code for each key designated on the overlay.

Thus, with the present invention computer operation can commence immediately after the cable is attached to the CPU and an overlay inserted into the keyboard. No training or difficult or tiring manual acts are required to commence operation or to change overlays or to even change CPUs. In addition, the keyboard of the present invention does not interfere with the software being run and thus, is compatible with all software.

In the present invention, a plurality of keyboard overlays are automatically (without operator assistance) recognized and activated. Each overlay is coded and is read by an overlay code detector which automatically reads the code of each overlay that is installed onto the keyboard.

The membrane keyboard of the present invention is operatively associated with a keyboard mapping data base organized into keyboard mapping data tables. These keyboard mapping data tables determine the particular internal code (signal) that is generated in response to a particular area of the membrane keyboard being pressed (activated). This internal code is then translated into machine-specific scan code understood by a CPU. Each data table is uniquely associated with one of the overlays through an overlay code identifier. Each overlay has a specific keyboard mapping data table that it selects whenever it is inserted onto the membrane switch.

Each keyboard mapping data table can be comprised of numerous (16 for example) variations or data table levels, any one of which can be selected to be operative. In this way, a single overlay code can be operatively associated with one of several different data table levels and thus, effectively with several different keyboard mapping data tables. The keyboard mapping data table is selected by the overlay code, the data table level is selected by another variable or variables.

The present invention is compatible with a variety of CPUs, each understanding scan codes having different content and protocol (it could be said that each CPU speaks a different "language" although they use the same "letters"). In order to connect the keyboard of the present invention to each of several different CPUs with which it is compatible, a unique connector cable is provided for each such CPU. The keyboard itself has a single output port that accepts the cable connector plug at one end of all cables for the keyboard. The other end of each cable is terminated by a connector plug that is specific for the keyboard port socket of the CPU for which it was designed. The keyboard port plug of each cable carries a CPU code. After the cable is installed in the keyboard, an on-board CPU code detector reads the code and thereby identifies the particular CPU to which the keyboard cable is connected. The identified CPU code is one of the variables that can determine the level of the keyboard mapping data table that is selected for use by the overlay code identifier.

Another set of variables that can determine which of the levels of a keyboard mapping data table is selected for operation are found on the "setup" overlay. This is an overlay that permits a number of customizations to be made to the keyboard, such as response rate, whether repeat is on or off, repeat rates, the speed of a mouse if it is being used, etc., which are essential for certain disabled users. For some of the setup overlay choices, selecting a particular customization selects a particular keyboard mapping data table level (sometimes in combination with the cable code). Other variables can also participate in the ultimate selection of a particular data table level.

The CPU code detector not only provides a variable that can select a particular level of a keyboard mapping data table but also, and possibly more importantly, it selects an internal code translation data table for converting internal code generated by the keyboard mapping data table into scan code that is sent over the cable to the attached CPU. The internal code generated in response to a keyboard press is not CPU specific and cannot be understood by a CPU. To make the internal code CPU specific, it must be translated into the scan code content and protocol suitable for the connected CPU.

The universality and facility of use of the keyboard of the present invention, compared to prior art keyboards, eases the burden of those who have struggled with prior art devices, enables use by others who could not operate prior art devices, and is useful for a variety of applications where disabilities are not the controlling consideration.

Accordingly, it is an object of the present invention to provide a computer keyboard that is easy to use and is adaptable for users having physical disabilities.

It is another object of the invention to provide a computer keyboard of the type using a membrane switch, which automatically recognizes different overlays without any manual act of the user beyond inserting the overlay in place on the keyboard.

It is a further object of the present invention to provide a computer keyboard for use with a variety of different computer CPUs wherein the keyboard automatically recognizes the computer CPU to which it is connected.

A further object of the present invention is to provide a computer keyboard, of the type that uses a membrane switch and a plurality of different overlays, for use with a number of different computer CPUs, wherein the keyboard automatically recognizes an installed overlay and the particular CPU to which it is connected by a cable, so that operation of the keyboard can begin with no manual preparatory actions by the user beyond plugging the keyboard into the computer and inserting an overlay onto the keyboard.

It another object of the present invention to provide a computer keyboard with a coded cable for connecting to a computer CPU and a CPU identifier that identifies the CPU to which the cable is connected when the cable is plugged into the keyboard.

An additional object of the present invention is to provide a method by which a membrane keyboard can be conveniently and automatically used in connection with a number of different overlays and a number of different CPUs.

There are other objects of the invention which in part are obvious and in part will become apparent form the description of the invention set forth herein below.

BRIEF DESCRIPTION OF THE DRAWINGS

FIG. 1 is an isometric view of the keyboard of the present invention in combination with a CPU;

FIG. 2 is an isometric illustration of the keyboard of FIG. 1 with certain parts broken away and the overlay more fully shown;

FIG. 3 is a sectional view taken along the line 3—3 of FIG. 2 showing details of the overlay code detector;

FIG. 4 is a block diagram illustrating the manner in which various data tables are selected; and FIG. 5 is a view of a code carrying cable connector with portions shown broken away.

DETAILED DESCRIPTION OF THE INVENTION

Referring to FIGS. 1, 2 and 3, a keyboard 11, of the present invention is connected through a cable 12 to a computer CPU 13. The monitor 14 displays the computer output.

The keyboard 11 has a front panel 16 which forms a frame 17 around a membrane switch 18. A portion of the lateral edges 19 and 21 of the frame 17 are spaced away from the switch pad 18 to form guide slots 22 and 23 which receive, guide and register key layout overlay 24 onto the membrane switch 18. Overlay 24 is one of several different overlays that can be used automatically with the keyboard without any manual identification apart from installing (inserting) the overlay onto the keyboard in guides 22 and 23, as more fully described below.

The overlay 24 carries an overlay code 26 on its obverse side 27 in the form of light and dark code areas 28. There are three designated areas 28 each of which can be either light (white) or dark (black), giving rise to eight possible combinations. Where circumstances require more than eight possible codes, the addition of other designated areas 28 increases the possible combinations and thereby the number of possible unique codes. Shades of gray, as well as other known methods can also be used to increase the number of unique codes.

When a coded overlay 24 is seated in the guide slots 22 and 23, code 26 aligns with an overlay code detector 29 formed of three photosensor assemblies 31 (photo source/photo sensor), each of which operatively aligns with only one of the code areas 28. The photosensor assemblies 31 are of the well known variety that send out an infra red radiation signal 32 and detect the reflected radiation 33. The level of radiation reflected from a dark surface differs from that reflected from a light surface and in this way assemblies 31 "read" the code 26 on the overlay 24. When no overlay is in place, the detector 29 reads the under side 34 of the front panel 16 at slot 22, which is either all dark or all light producing a code that represents the absence of an overlay.

Other forms of codes and detectors are possible and include such known combinations as holes or raised areas and mechanical switches, bar codes and bar code readers, and the like. What distinguishes the present invention is not so much the code and code detector employed but rather that the code is automatically read without operations required of the user beyond installing the coded overlay.

Referring also to FIG. 4, this automatic overlay recognition is accomplished by the combination of the code 26 on the overlay 24 and the operation of the overlay code detector 29. The overlay code detector 29 is stimulated to "read" the code 26 by a code detector prompt 36 that sends a "read" signal 35 to the overlay code detector 29 at regular intervals. In the preferred embodiment of the invention, the prompt 36 is set at a frequency of several times a second, assuring that any change in the overlay 24 and code 26 is detected in a timely manner. Thus, once an overlay is registered in the guides 22 and 23, the code 26 is automatically identified without the need of any additional manual user prompt.

The keyboard 11 includes an embedded microprocessor 15 (see FIG. 2) (such as an 80C32) and ROM 20 (see FIG. 2). The ROM 20 stores an overlay data base 37 containing a number of different overlay mapping data tables 38. The number of different data tables 38 that can be identified by the overlay code detector 29 alone is equal to the number of unique codes that can be generated by overlay code 26 (which is eight in the given example). The recognition of a code 26 by detector 29 results in a signal 30 to the microprocessor which responds by selecting a data table 38 that corresponds to the recognized overlay code 26.

Each data table 38 has as many as sixteen different levels, each of which is capable of variations that make them unique from one another. Thus, the eight data tables 38 can be further multiplied by sixteen to create 128 different possible data tables in all. An overlay mapping data table level selector 40 (part of the code used by the microprocessor) selects the level of the selected data table 38. The utility of this configuration is that it enables a single overlay to be useful with different CPUs that require different mapping for the same overlay (to deactivate certain keys on an overlay that don't pertain to a particular CPU, for example).

A number of variables can be used by the level selector 40 to determine the particular level of a selected data table 38 that is activated, including the type of CPU to which the keyboard 11 is connected. Each data table (level) contains the information by which each switch of the membrane switch 18 is associated with a particular internal code so that activation of that switch results in that internal code being generated by the microprocessor and sent to an internal code translator 51 which translates internal code to scan code. For each different overlay it is necessary that the individual membrane switches and their aligned internal codes are consistent with the information visually displayed on the overlay. That is to say, If a key on the overlay is designated as the letter "a", touching the overlay at that key should produce an internal code delivered to the translator 51 which the translator understands as the letter "a". Similarly, if the key is designated with a direction arrow, pushing that key should produce an internal code that the translator understands as an arrow. Thus, the internal code that is generated in response to a keyboard press is a function of the selected keyboard mapping data table 38 and its selected level. One of the features of the present invention is the automatic recognition of the selected CPU and the way in which the level of mapping table 38 is selected.

Referring to FIG. 5, cable 12 terminates at one end in a commercial connector plug 39 which mates with the output port socket 41 of the keyboard 11. The other end of the cable 12 terminates in a commercial CPU connector plug 42 which mates with the keyboard input port socket (not shown) of the CPU with which the keyboard 11 is to be used. The keyboard 11, according to the present invention, is compatible with different CPUs, each of which has different scan codes that it understands. In order for the keyboard 11 to send scan codes to the CPU which the CPU can understand, it is necessary that the keyboard "knows" the CPU to which it is connected.

In the present invention, the keyboard plug 39 carries a CPU code 45 that identifies the CPU into which the CPU plug 42 is designated to be connected. Keyboard output port plug 39 has a plurality of pins 43 that are mechanically inserted into the keyboard port (socket) pin receptacles 44, when the plug and socket are mated. All of the CPUs with which the keyboard of the present invention is compatible (IBM® PC, IBM® AT, Apple IIe, Macintosh®, and others) require that one of the lines (wires) within the keyboard cable be maintained at electrical ground (at the CPU). Thus, one of pins 43 (pin 46, for example) is attached to the ground line 50 and is itself at electrical ground. The connector plug 39 includes in addition to the pins necessary to connect various wires between the keyboard 11 and the CPU 13, four CPU code pins 47 that do not carry wires between the keyboard and the CPU. Pins 47 are used, in the present invention, to establish a CPU code 45 that uniquely identifies the CPU to which the cable it to be connected. The code is established by electronically connecting one or more of the pins 47 to the ground pin 46. The combination of grounded and ungrounded pins 47 creates the CPU cable code 45 that is read by a CPU code detector 48 (which can be part of the keyboard's embedded microprocessor) and converted to a CPU code signal 49. Every time the CPU is powered up, the code 45 is read and the system is automatically provided with the necessary CPU identification information. The CPU code signal 49 (that identifies the CPU being used) is directed (among other places) to the data table level selector 40 as one of the variables used to select the overlay mapping table level by the level selector 40.

By way of example, if an overlay includes keys for mouse operation but is otherwise useful with both IBM® and Macintosh® CPUs, the CPU detector 48 sends a signal 49 to the table level selector 40 identifying the CPU as either IBM® or Macintosh®, and the level selector 40 selects the data table level with active mouse keys if the Macintosh® CPU is identified, and the table level with the mouse keys deactivated if the IBM® CPU is identified.

The act of plugging the keyboard plug 39 into the keyboard 11 and powering up is all that is required to properly configure the keyboard for use with the CPU. In addition, since the keyboard plug 39 is the same on all cables, the keyboard 11 requires only a single output port for use with any of the CPUs with which the keyboard is designed to operate.

The selection of a data table level is not a function to the CPU code signal 49 alone. Other variables can, and in fact do, contribute to the selection of a overlay mapping data table level. One of the overlays that is standard with the keyboards of the present invention is a "setup" overlay that is useful in setting certain preferences. When for example, the setup overlay is in place on the keyboard 11, pressing (activating) selected keys sets such parameters as response rate, repeat on or off, repeat rate, mouse speed, shift mode, key sound on or off, etc. For some of these parameters the desired parameter is activated by delivering a signal 53 to the level selector 40 informing it which preference has been selected. The selector 40 then selects a data table level that includes that preference or preferences. Thus, in addition to the overlay code 26 and the CPU code 45, selected setup preferences also impact the data table level ultimately selected for operation. Other variables can be used as data table level selectors in the same way.

Using the various inputs, data table level selector 40 ultimately selects an overlay mapping data table level 54 to be active. This is the table that determines the particular internal code (signal) 55 that is generated for a given key press 56. Because each different type of CPU has a different scan code protocol, the internal code 55 must be translated into the correct scan code 60 before being sent to the CPU.

A translation data base table 57 includes a plurality of internal code translator tables 51; one for each of the different CPUs with which the keyboard is to be used. The translation data table 51 that is selected to be operable is a function of the CPU code 45 as made available to the translator table data base 57 by CPU code signal 49. The code signal 49 is used to select the translation data table 51 that corresponds to the CPU in operation.

Each of the internal code translation tables 51 corresponds an internal code signal 55, representing a particular key press, to a scan code. Each internal code signal 55 is directed to the selected internal code translation table 51 where it is converted into the correct scan code 60 for the CPU in operation.

As is apparent from the foregoing, the method of the present invention includes some or all of the following steps: creating an overlay code to be carried by each overlay to be used by the keyboard, reading the overlay code of an installed overlay at periodic intervals that are short, such as several times a second; selecting an overlay mapping data table as a function of the overlay code read, creating a CPU code carried by the keyboard output port plug identifying the CPU in operation; reading the CPU code; selecting an overlay mapping data table level as a function of the CPU code read; creating an internal code signal in response to a keyboard press as a function of the overlay mapping data table level selected; selecting a internal code translation data table as a function of the CPU code; and converting the internal code signal to a scan code signal by the selected internal code translation data table.

One of the outstanding features of the present invention is that the previously difficult identifications of the overlay and CPU are automatic, requiring no user action beyond inserting the overlay onto the keyboard and plugging the cable into the keyboard. After those basic tasks are performed, computer operation is ready to commence.

Obviously, many modifications and variations of the present invention are possible in light of the above teachings. For example, the translation tables could be combined with the overlay tables such that the overlay mapping table level selected as a function of the CPU code would contain the correct scan codes for the CPU identified by the CPU code. This could eliminate the need for an internal code altogether. It is, therefore, to be understood that within the scope of the appended claims the invention may be practiced otherwise than as specifically described.

We claim:

1. In a computer keyboard having an on-board microprocessor and ROM, an output port through which scan codes are directed to a computer CPU over a cable, wherein the cable is connected at its keyboard end to the output port of the keyboard by a keyboard connector plug and at its CPU end to the CPU keyboard input port by a CPU connector plug compatible with a particular CPU and the keyboard is of the type having a plurality of touch activated switches under a membrane onto which one of a plurality of different key layout overlays can be installed and wherein the microprocessor generates one of several possible internal signals in response to activation of a touch activated switch, the improvement comprising:

a plurality of overlay mapping data tables stored in the on-board ROM wherein each overlay mapping data table has a plurality of levels and is associated with a particular key layout overlay;

an overlay identification code on each key layout overlay, an overlay identification code detector on the keyboard responsive to a key layout overlay being installed onto the keyboard to detect said overlay identification code on the installed key layout overlay and generate a signal representative of such detected code;

an overlay mapping data table selector in the microprocessor responsive to the signal generated by said overlay identification code detector to select a particular overlay mapping data table for use with the installed key mapping overlay;

a CPU code on the keyboard connector plug identifying the particular CPU with which the CPU connector plug on the same cable is compatible;

a CPU code detector on the keyboard for detecting said CPU code on a keyboard connector plug plugged into the keyboard and generating a CPU identifying signal; and an overlay mapping data table level selector in the microprocessor responsive to the signal generated by said CPU code detector to select a particular overlay mapping data table level for use with the CPU connected to the keyboard by the cable.

2. The invention of claim 1 further comprising:

a plurality of internal code translation tables stored in the ROM for translating internal code to scan code;

an internal code translation table selector in the microprocessor responsive to the signal generated by said CPU code detector to select a particular stored internal code translation table for translating internal code to scan code understandable by the detected CPU.

3. The invention of claim 2 wherein said CPU code is a plurality of plug connector pins selectively electrically connectable to one another in various combinations.

4. The invention of claim 3 wherein said CPU code detector is operable to ascertain the connection combination of said plug connector pins at the keyboard output port.

* * * * *